Patented Jan. 21, 1941

2,229,052

UNITED STATES PATENT OFFICE 2,229,052

METHOD OF PRESERVING SENSITIZING SOLUTIONS

Edward Frank Dell, Park Ridge, Ill., assignor to Davidson Manufacturing Company, a corporation of Wisconsin No Drawing. Application October 29, 1937, Serial No. 171,808

4 Claims. (Cl. 95—7)

In photolithography, it is necessary to use a sensitizing solution for making the metal plate on which the image is to be applied sensitive to light, and the sensitizing solutions most commonly used contain albumen, which has a tendency to spoil in from two to five days.

According to conventional practice, the sensitizing solution is spread upon a metal plate, and, after it has dried, the plate is exposed to light with the photographic film or plate whose image is to be reproduced interposed between the light source and the coated plate. The image is transferred by this process to the plate, inasmuch as the sensitized coating on the plate becomes hardened, water insoluble, and grease receptive wherever it is exposed to light. Ordinarily, a developing ink is applied to the plate after it has been exposed in order to bring out and strengthen the image. The plate is then washed with water, and all but the water insoluble image is removed by this process from the plate. An etch is then applied in the usual manner to make the non-image portion of the plate grease repellent. The etch does not affect the image itself, due to the properties which the sensitizer acquired by exposure to light during the making of the image on the plate and also because the developing ink which has a greasy base strengthens and protects the image from the etching solution.

The principal object of this invention, therefore, is to provide a sensitizing solution suitable for use in photolithography which may be kept over long periods of time without deterioration.

Ordinary preservatives have been tried without success, and many such preservatives having strong antiseptic properties were found totally unsatisfactory for the reason that, regardless of whether bacteriological spoilage had actually set in, some change in the solution did take place after relatively short periods of time which made the solution unsatisfactory for the lithographic process. Such solutions, while having in many instances all of the appearances of a fresh or unspoiled solution and even while being used to make the plate were apparently satisfactory, were nevertheless found totally useless because the plates made with these solutions would not stand up in service, particularly because the image on the plate would quickly break down making the plate unsatisfactory for further reproductions. Furthermore, the plates made with such solutions had a tendency to go blind; i. e., the non-image portion of the plate would take on ink, even after appropriately etched with the usual plate etch.

After many such efforts had failed, I discovered that by adding a small quantity of thymol to egg albumen sensitizing solutions not only did the solutions have the property of being able to be kept almost indefinitely, but they also apparently had the amazing property of improving with age, because plates made with such solutions treated thuswise with thymol seemed to have a stronger and more stable image than plates made with fresh egg albumen sensitizers.

By way of example, the sensitizing solutions of this invention, before being treated with thymol, may consist of 25 ounces of egg albumen, 6 ounces and 275 grains of ammonium bichromate, 15 ounces of liquid 28% ammonia, and three gallons of distilled water. The sensitizing solution is made by mixing the albumen in two gallons of water, mixing the bichromate in one gallon of water, mixing the two together, and then adding enough ammonia to change the color from orange to yellow, which may be more or less than the amount given above. The thymol is then added to preserve the solution in its original state of freshness.

As far as I am aware, it has always been assumed that sensitizing solutions containing egg albumen will spoil, but I have found that the solution can be kept almost indefinitely if the solution is treated in accordance with my method. This is of particular advantage where the sensitizing solution is to be used with photolithographic apparatus designed for small users for it avoids the onerous task of making a new sensitizing solution every few days whenever the apparatus is to be used.

Obviously the proportions and ingredients for the sensitizing solution may vary widely without departing from the spirit of this invention.

What I claim is:

1. A sensitizing solution for use in photolithography in which the sensitizing solution is first spread on a lithographic plate, then exposed to light while covered with a photographic film or plate, and finally washed with water to remove all but the water insoluble image left on the plate by the hardening and rendering insoluble of the image portion of the sensitizer by the light passing through the film or plate, said sensitizing solution containing egg albumen and thymol.

2. A sensitizing solution for use in photolithography in which the sensitizing solution is first spread on a lithographic plate, then exposed to light while covered with a photographic film or plate, and finally washed with water to remove all but the water insoluble image left on the plate by the hardening and rendering insoluble of the image portion of the sensitizer by the light passing through the film or plate, said sensitizing solution containing egg albumen, ammonium bichromate, and thymol.

3. A sensitizing solution for use in photolithography in which the sensitizing solution is first spread on a lithographic plate, then exposed to light while covered with a photographic film or plate, and finally washed with water to remove all but the water insoluble image left on the plate by the hardening and rendering insoluble of the image portion of the sensitizer by the light passing through the film or plate, said sensitizing solution containing egg albumen, ammonium bichromate, ammonia, and thymol.

4. The process of preparing a sensitizing solution for use in photolithography in which the sensitizing solution is first spread on a lithographic plate, then exposed to light while covered with a photographic film or plate, and finally washed with water to remove all but the water insoluble image left on the plate by the hardening and rendering insoluble of the image portion of the sensitizer by the light passing through the film or plate, said process comprising the steps of taking a quantity of egg albumen, mixing with the egg albumen a quantity of ammonium bichromate, adding to the mixture thus formed a sufficient quantity of ammonia to change the solution from orange to yellow, and then at some stage during the process adding a quantity of thymol.

EDWARD F. DELL.